United States Patent

Guarneri

Patent Number: 5,294,454
Date of Patent: Mar. 15, 1994

[54] METHOD OF DRYING PASTA CONTAINING INGREDIENTS OF MARKED COLORATION

[75] Inventor: Roberto Guarneri, Parma, Italy

[73] Assignee: Barilla G. eR. F.lli - Societa Per Azioni, Parma, Italy

[21] Appl. No.: 896,821

[22] Filed: Jun. 9, 1992

[51] Int. Cl.⁵ .................................................. A23L 1/16
[52] U.S. Cl. ..................................... 426/557; 426/249; 426/451
[58] Field of Search ................... 426/249, 451, 557

[56] References Cited

U.S. PATENT DOCUMENTS

| | | | |
|---|---|---|---|
| 2,667,613 | 5/1954 | Shiah | 426/557 |
| 3,192,049 | 6/1965 | Kinsley | 426/557 |
| 3,328,174 | 6/1967 | Bassano | 426/557 |
| 4,243,690 | 1/1981 | Murakami et al. | 426/451 |
| 4,915,966 | 4/1990 | Guarneri | 426/451 |
| 5,122,378 | 6/1992 | Hauser et al. | 426/451 |
| 5,124,168 | 6/1992 | McMillin et al. | 426/451 |

FOREIGN PATENT DOCUMENTS 2208197 7/1988 United Kingdom .

*Primary Examiner*—Donald E. Czaja
*Assistant Examiner*—Mary S. Mims
*Attorney, Agent, or Firm*—Sughrue, Mion, Zinn, Macpeak & Seas

[57] ABSTRACT

In order to stabilise the colour of pasta containing ingredients of marked coloration such as spinach, tomatoes and the like, the pasta is treated with saturated steam at 75° to 80° C. and is then dried at temperatures below 60° C. until a moisture content of 11% is reached.

2 Claims, No Drawings

METHOD OF DRYING PASTA CONTAINING INGREDIENTS OF MARKED COLORATION

BACKGROUND OF THE INVENTION

In its general aspects, the present invention relates to a method of drying pasta.

In particular, this invention relates to a process of drying pasta which contains ingredients of marked coloration such as spinach, tomatoes, etc. which impart characteristic colour and flavour to it.

Even more particularly, the invention relates to a method of drying pasta of the aforesaid type which is intended to stabilise the colour of the dry pasta.

It is well known that dry pasta to which ingredients have been added to impart to it particular characteristic features of flavour and colour is subject to rapid deterioration which, according to the ingredients used in the pasta, will already be apparent 15-30 days after production and will increase progressively in a significant manner so that after some time the pasta assumes an appearance and a flavour which are far removed from the original flavour and appearance.

In fact, it is readily possible to establish that in pasta which is kept in the dark, for example in opaque containers, the colour of the pasta becomes progressively more brown. Thus, for example, tagliatelle with a spinach filler and packed in opaque containers, will lose its original green colour and become brown.

In other cases, in pasta which is kept in packages which are transparent to the light, the original colour progressively darkens and tends towards light grey. For example, spinach-filled tagliatelle turns from the original green to a yellowish colour and finally to grey.

Although less obvious than the deterioration in the colour, the flavour of these pastas to which ingredients of the type in question have been added is also subject to a progressive deterioration which may reach a point where the actual product is spoiled.

The problem which is at the root of this invention is that of obviating the aforementioned disadvantages and making available a treatment to stabilise the colour of the coloured dry pastas, which can be easily integrated into a general process for the production of dry pasta, employing the same apparatus as are normally used in such processes.

SUMMARY OF THE INVENTION

According to the invention, this problem is resolved by a method of drying pasta which includes ingredients which impart colour to it, and which is characterised in that it comprises a step of treating the fresh pasta with saturated steam at 75°-80° C. followed by a drying phase at temperatures of from 50° to 60° C. until a moisture content of 11-12% is attained.

By applying the process according to this invention, it has surprisingly been found that the colour of the pasta, originally attributed to it by the ingredient used within it, for example spinach, could be maintained as it was for at least four months from the moment of production.

This advantageous result was then improved by packaging the dry pasta obtained by the process according to the invention in containers provided with a barrier to oxygen and water vapour and with an inert atmosphere, for example due to the presence of nitrogen and carbon dioxide. Such a packaging has proved capable of extending up to twelve months the maintenance of the original organoleptic characteristics imparted to the pasta by the ingredients used within it.

The invention will become clearer from the ensuing description of an embodiment of the method according to the invention and from comparison of the coloured dry pasta thus obtained with that obtained by conventional means.

DETAILED DESCRIPTION OF THE INVENTION

A pasta mixture obtained conventionally from semolinal spinach, eggs and water is extruded through a suitable die to produce a sheet which can be subsequently worked still by conventional means in order to obtain tagliatelle with a spinach flavouring.

Tagliatelle with spinach, prepared fresh, had a moisture content of 32% and a bright green colouring.

With equal quantities of these tagliatelle, two samples A and B were prepared.

COMPARATIVE EXAMPLE

The tagliatelle of sample A were dried by conventional means. They were first subjected to a predrying phase in an environment at 65° C. with a relative humidity of 60% and subsequently to a real drying phase in an environment at 60° C. and a relative humidity of 75%.

The dwell time of the tagliatelle in this latter environment was extended until their moisture content reached 11%.

Dry spinach-flavoured tagliatelle had a dull green colour, a good aroma and a good flavour. These tagliatelle were packaged in cardboard containers sealed by a suitable film of transparent plastic material.

EXAMPLE 1

A part of the tagliatelle from sample B was treated according to the invention with saturated steam at 75°-80° C. and was subsequently exposed to a predrying phase in an environment at 65° C. and a relative humidity of 75% and then to a final drying phase in an environment at a temperature of 60° C. and a relative humidity of 75%. The dwell time of these tagliatelle in the final drying environment was extended until their moisture content reached 11%.

The dried spinach-flavoured tagliatelle thus obtained had a bright green colour, a good aroma and a good flavour.

The tagliatelle was then packaged in containers of transparent plastics film in an environment of $CO_2$ plus $N_2$.

EXAMPLE 2

The remaining portion of tagliatelle from sample B was subjected to a treatment according to the invention using saturated steam at 75°-80° C. Subsequently, the tagliatelle underwent a predrying phase as in Example 2 and then a drying phase in an environment at a temperature of 50° C. and a relative humidity of 75%.

Final drying was extended until such time as the moisture content of the tagliatelle reached 11%.

These tagliatelle had a bright green colour, a good aroma and a good flavour. They were then packaged in transparent containers of barrier plastic film in an atmosphere of carbon dioxide and nitrogen.

The organoleptic characteristics (colour, odour and flavour) of the tagliatelle obtained in conventional manner and those obtained by the process according to the present invention were evaluated after two, four, six, eight, ten and twelve months. The assessments were supplied by a "sensory panel" of persons qualified for carrying a sensorial analysis and who reach their assessment on blind samples (blind pire comparison).

The results of these analyses are summarised in the following table.

| TIME (months) | APPEARANCE | AROMA | FLAVOUR |
|---|---|---|---|
| 0 | A = DULL GREEN | A = GOOD | A = GOOD |
|   | A = BRIGHT GREEN | B = GOOD | B = GOOD |
| 2 | A = LIGHT GREEN | A = MODERATE | A = MODERATE |
|   | B = BRIGHT GREEN | B = GOOD | B = GOOD |
| 4 | A = YELLOWISH GREEN | A = INADEQUATE | A = INADEQUATE |
|   | B = BRIGHT GREEN | B = GOOD | B = GOOD |
| 6 | A = YELLOWISH GREEN | A = INADEQUATE | A = INADEQUATE |
|   | B = INTENSE GREEN | B = GOOD | B = GOOD |
| 8 | B = INTENSE GREEN | B = GOOD | B = GOOD |
| 10 | B = INTENSE GREEN | B = MODERATE | B = MODERATE |
| 12 | B = LIGHT GREEN | B = MODERATE | B = MODERATE |

A = CONVENTIONAL
B = ACCORDING TO THE INVENTION
ORGANOLEPTIC ASSESSMENT:
INADEQUATE
ADEQUATE
MODERATE
GOOD

What is claimed is:

1. A method of drying pasta which includes ingredients which impart colour to it, comprising treating fresh pasta with saturated steam at 75°–80° C. followed by a drying phase at temperatures of from 50° to 60° C. until a moisture content of 11–12% is attained.

2. Dry pasta coloured by the presence therein of ingredients which impart color to it, when obtained by the method according to claim 1.

* * * * *

UNITED STATES PATENT AND TRADEMARK OFFICE
CERTIFICATE OF CORRECTION

PATENT NO. : 5,294,454
DATED : March 15, 1994
INVENTOR(S) : Roberto GUARNERI

It is certified that error appears in the above-indentified patent and that said Letters Patent is hereby corrected as shown below:

On the title page, insert the following information:

-- [30]    Foreign Application Priority Data
              June 10, 1991  [IT]  ITALY ...... MI 91 A 001594    --

Signed and Sealed this

Twenty-first Day of March, 1995

Attest:

BRUCE LEHMAN

*Attesting Officer*        *Commissioner of Patents and Trademarks*